United States Patent
Rose

(10) Patent No.: US 8,201,010 B2
(45) Date of Patent: Jun. 12, 2012

(54) AUTOMATIC REFERENCE FREQUENCY COMPENSATION

(75) Inventor: Philip David Rose, Islip (GB)

(73) Assignee: PLX Technology, Inc., Sunnyvale, CA (US)

( * ) Notice: Subject to any disclaimer, the term of this patent is extended or adjusted under 35 U.S.C. 154(b) by 240 days.

(21) Appl. No.: 12/782,499

(22) Filed: May 18, 2010

(65) Prior Publication Data

US 2011/0289338 A1 Nov. 24, 2011

(51) Int. Cl.
*G06F 1/12* (2006.01)
*H03H 7/30* (2006.01)

(52) U.S. Cl. ........ 713/400; 713/401; 713/500; 713/501; 375/231; 375/355; 375/373

(58) Field of Classification Search ................. 713/400; 375/231, 355, 373
See application file for complete search history.

(56) References Cited

U.S. PATENT DOCUMENTS

| | | | | |
|---|---|---|---|---|
| 7,739,617 | B2 * | 6/2010 | Ording et al. ................. | 715/790 |
| 7,930,582 | B2 * | 4/2011 | Nagasawa ...................... | 713/601 |
| 2010/0122106 | A1 * | 5/2010 | Lee et al. ....................... | 713/503 |
| 2010/0169523 | A1 * | 7/2010 | Dunstan et al. ............... | 710/104 |
| 2011/0016346 | A1 * | 1/2011 | Lee et al. ....................... | 713/503 |
| 2011/0138214 | A1 * | 6/2011 | Tseng et al. ................... | 713/500 |
| 2011/0170644 | A1 * | 7/2011 | Iqbal et al. .................... | 375/355 |

OTHER PUBLICATIONS

"USB 3.0 CDR Model White Paper Revision 0.5"—16 pages, Dated Jan. 15, 2009.*
National Instruments—"PCI Exprss Clock Specifications and Effect on NI PXIe-PCIe8375 Interoperability"; 5 pages, Dated Nov. 2009.*
"Universal Serial Bus 3.0 Specification Revision 1.0"—482 pages, Dated Nov. 12, 2008.*
Synopsys—"SuperSpeed Your SoCs with USB 3.0 IP"; 10 pages, Dated Jan. 2010.*
Adnaco—"USB 3.0 Interoperability Application Notes"; 6 pages, No Date Provided.*
PLX Technology—"Product Brief—USB 3380, PCI Express to USB 3.0 Peripheral Controller"; 2 pages, Dated Aug. 17, 2011.*
PLX Technology—"Product Brief—USB 3382, PCI Express to USB 3.0 Peripheral Controller"; 2 pages, Dated Aug. 17, 2011.*
Intel—"PHY Interface for the PCI Express and USB 3.0 Architectures Version 3.0"; 48 Pages, Dated 2009.*
Brian Randell—"Hardware/Software Tradeoffs: A general Design Principle?"; 3 pages, Dated Jan. 25, 1985.*

* cited by examiner

*Primary Examiner* — Brian Misiura
(74) *Attorney, Agent, or Firm* — Beyer Law Group LLP

(57) ABSTRACT

In a first embodiment of the present invention, a method for operating a device having a device reference clock, in a system including a host with a host reference clock is provided, the method comprising: beginning a link negotiation stage between the device and the host using the device reference clock; during the link negotiation stage, sampling data received from the host to determine a frequency offset of the host reference clock; applying the frequency offset to the device reference clock to create a corrected device reference clock; and completing the link negotiation stage using the corrected device reference clock. This completing may include either continuing the original link negotiation stage or restarting it.

16 Claims, 4 Drawing Sheets

AUTOMATIC REFERENCE FREQUENCY COMPENSATION

BACKGROUND OF THE INVENTION

1. Field of the Invention

The present invention relates generally to computer devices. More specifically, the present invention relates to automatically compensating the reference clock frequency of a device based on a host clock.

2. Description of the Related Art

Computer architectures have advanced greatly over the years. Lately it is becoming more and more commonplace for chip designers to include external data interfaces, such as Universal Serial Bus (USB) interfaces into their motherboards. These interfaces are known as host controllers. The processor is typically then connected to the other components of the computer system via an input/output (I/O) interconnect system.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to run must faster.

Recently, a successor to PCI has been popularized, termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

Some of the host controllers built into chips compatible with PCIe interconnects use the PCIe reference clock as the reference clock for data communications over the external data interfaces. For example, some PCIe-to-USB3.0 host controllers use the PCIe reference clock for transmissions over USB3.0.

A lot of personal computers have non-compliant PCIe clocks, due to overclocking, or the use of a center-spread reference clock instead of a down-spread reference clock to avoid electromagnetic compatibility (EMC) issues. When the clock is used solely for PCIe, these non-compliant clocks have no ill-effect, because the clock signal travels with the data, and thus the receiving device can easily correct for any particular clock problems. Now that these non-compliant PCIe clocks, however, are coupled to USB 3.0 host controllers, this creates some issues.

Unlike PCIe, which transmits a clock signal separate from the data stream, in USB3.0 the attached device has a local reference in addition to recovering a clock signal from the data stream received from the host. In order to ensure that hosts and devices interoperate reliably, the USB3.0 specification only allows for a maximum of a 5600 parts per million (ppm) difference in these clocks. Clock accuracy is typically measured in ppm, and an individual clock's accuracy is typically provided as a range of plus or minus a certain figure from the nominal clock rate of 5 Gbps. The 5600 ppm requirement comes from the fact that a certain amount of disparity between reference clocks can be compensated for by inserting or deleting control characters, known as SKP ordered sets (consisting of two SKP K-Symbols) into or from the data stream. However, the USB3.0 specification only allows for a certain number of these control characters to be inserted or deleted, and a difference of more than 5600 parts per million would require more control characters than are available in the standard.

As described above, the PCIe clock may not simply be different due to overclocking, but also due to the use of a center-spread reference clock. In a center-spread reference clock, the accuracy varies in both the positive direction and the negative direction from the nominal bit rate/ppm. FIG. 1 is a graph illustrating reference clocks of various components. The reference clock for host A 100 is a center-spread reference clock, and as can be seen the clock signal varies from +2500 to −2500 ppm from the nominal bit rate of 5 Gbps. This is in contrast to a down-spread reference clock, the accuracy varies only in the negative direction from a zero point of bit rate/ppm. Here, both host B's reference clock 102 and device's reference clock 104 are shown as down-spread reference clock, both varying the clock signal between 0 and −5000 ppm.

In light of these variances from some PCIe reference clocks and USB3.0 reference clocks, there may be situations where the USB3.0's required maximum difference in clocks of 5600 ppm is violated. Specifically, referring to FIG. 1, the difference between Host A's reference clock 100 and device's reference clock 104 can have a worst case difference of 7500 ppm (depicted at line 106). This despite the fact that both reference clocks individually have no more than a 5000 ppm variance.

Also notably, Host B's reference clock 102, being a down-spread reference clock, will have a maximum difference from the device reference clock 104 of no more than 5000 ppm variance, despite having essentially the same characteristics of Host A's reference clock 100 except for the down-spread aspect.

The grand result of all this is that there are certain situations where an attached USB3.0 device will fail to work with a host controller. There are many such motherboards in the market today.

SUMMARY OF THE INVENTION

In a first embodiment of the present invention, a method for operating a device having a device reference clock, in a system including a host with a host reference clock is provided, the method comprising: beginning a link negotiation stage between the device and the host using the device reference clock; during the link negotiation stage, sampling data received from the host to determine a frequency offset of the host reference clock; applying the frequency offset to the device reference clock to create a corrected device reference clock; and completing the link negotiation stage using the corrected device reference clock. This completing may include either continuing the original link negotiation stage or restarting it.

In a second embodiment of the present invention, a system is provided comprising: a host device having a host reference clock; a motherboard coupled to the host device; and a device having a device reference clock and coupled to the motherboard, wherein the device has logic to: begin a link negotiation stage between the device and the host using the device reference clock; during the link negotiation stage, sample data received from the host to determine a frequency offset of the host reference clock; apply the frequency offset to the device reference clock to create a corrected device reference clock; and complete the link negotiation stage using the corrected device reference clock.

In a third embodiment of the present invention, a device containing a device reference clock, for coupling to a motherboard having a host with a host reference clock, is provided, the apparatus comprising: means for beginning a link negotiation stage between the device and the host using the device reference clock; means for during the link negotiation stage, sampling data received from the host to determine a frequency offset of the host reference clock; means for applying the frequency offset to the device reference clock to create a corrected device reference clock; and means for completing the link negotiation stage using the corrected device reference clock.

In a fourth embodiment of the present invention, a program storage device is provided, readable by a machine tangibly embodying a program of instructions executable by the machine to perform a method for operating a device having a device reference clock, in a system including a host with a host reference clock, the method comprising: beginning a link negotiation stage between the device and the host using the device reference clock; during the link negotiation stage, sampling data received from the host to determine a frequency offset of the host reference clock; applying the frequency offset to the device reference clock to create a corrected device reference clock; and completing the link negotiation stage using the corrected device reference clock.

DETAILED DESCRIPTION OF SPECIFIC EMBODIMENTS

Figure 1:
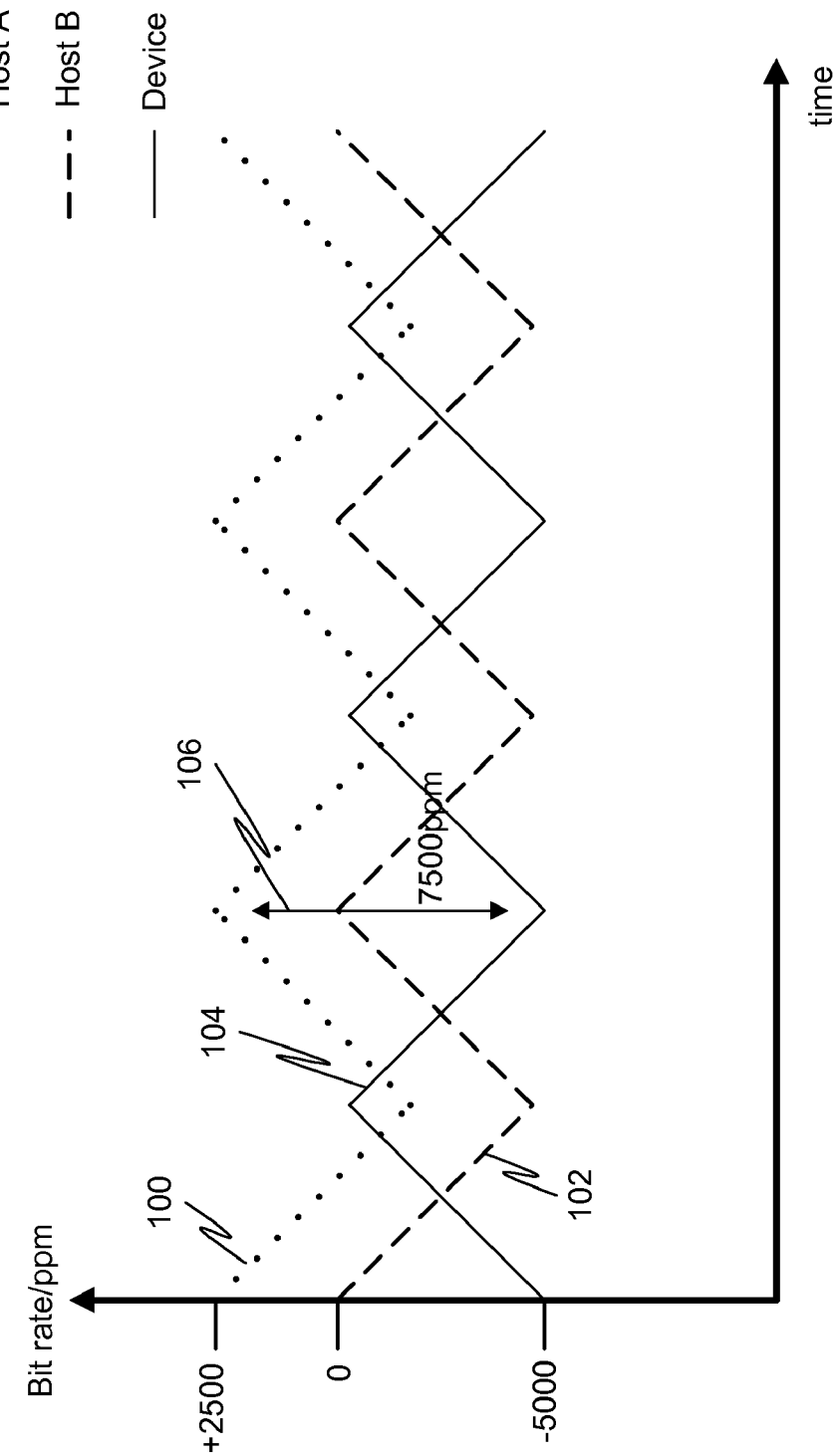
FIG. 1 is a graph illustrating reference clocks of various components.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, the reference clock of the interconnect is sampled at the time of link negotiation, and an offset is applied to the device reference clock to compensate for the differences between the device reference clock and the host reference clock. This permits the device to be compatible with a non-compliant interconnect/motherboard without needing to alter the reference clock of the non-compliant interconnect. It may or may not be possible to alter the reference, depending on the implementation and/or the technical capability of the user.

In an embodiment of the present invention, an initial device reference clock frequency is set. For example, a USB3.0 reference clock can be initially set to a fixed frequency of 5.00 GHz. This is merely one example of the initial device reference clock frequency. Since this initial reference clock frequency is only going to be used during the beginning of the link negotiation phase, where the difference between the reference clock and the data recovered clock is not of major importance, there are a wide variety of different frequencies at which the initial device reference clock can be set. As long as this initial device reference clock frequency allows for link negotiation to occur, the initial value can be set to any level.

Subsequently, during link negotiation, the reference clock of the interconnect (e.g., PCIe architecture) is sampled. In USB3.0, the host and device go though a link training stage called Polling.RxEQ, where each receiver adjusts its equalizer to account for the individual cable characteristics and locks to the link partner's reference clock. During this stage, control characters are not sent, but the link is tolerant to reference clock differences as any of the received data characters may be dropped without causing a failure. As such, at this stage, the link is much more robust.

The sampling involves recording the frequency of the incoming data (for example every microsecond for a hundred microseconds). If the host reference clock is not performing spread spectrum, this sampling obtains a peak frequency. If the host reference clock is performing spread spectrum, this sampling results in a histogram of the relevant frequency points.

Following the sampling, a corresponding offset is applied to the device reference clock in order to minimize the frequency difference between the host and device. Then the link negotiation can be completed using the different device reference clock. This may be accomplished either by continuing the existing link negotiation stage or restarting the stage. The link will now operate correctly.

The act of sampling can take many forms, depending upon the implementation. In one embodiment, a phase-locked-loop is used to generate the recovered clock. This works by generating a phase error signal from the difference between a recovered clock edge and the data bit edge. This signal is passed through a filter and used to control a voltage controlled oscillator, which generates the recovered clock. Thus, in this embodiment there is a closed-loop system, which causes the recovered clock to track the received data bit rate. This analog circuit can also be realized digitally using a Digital Phase-Locked Loop (DPLL) and digital feedback logic.

Oddly enough, this solution may result in both reference clocks now being non-compliant rather than just the host reference clock. Nevertheless, this solution effectively allows for a compliant device to be connected to a non-compliant host without requiring user intervention in altering reference clocks.

Figure 2:
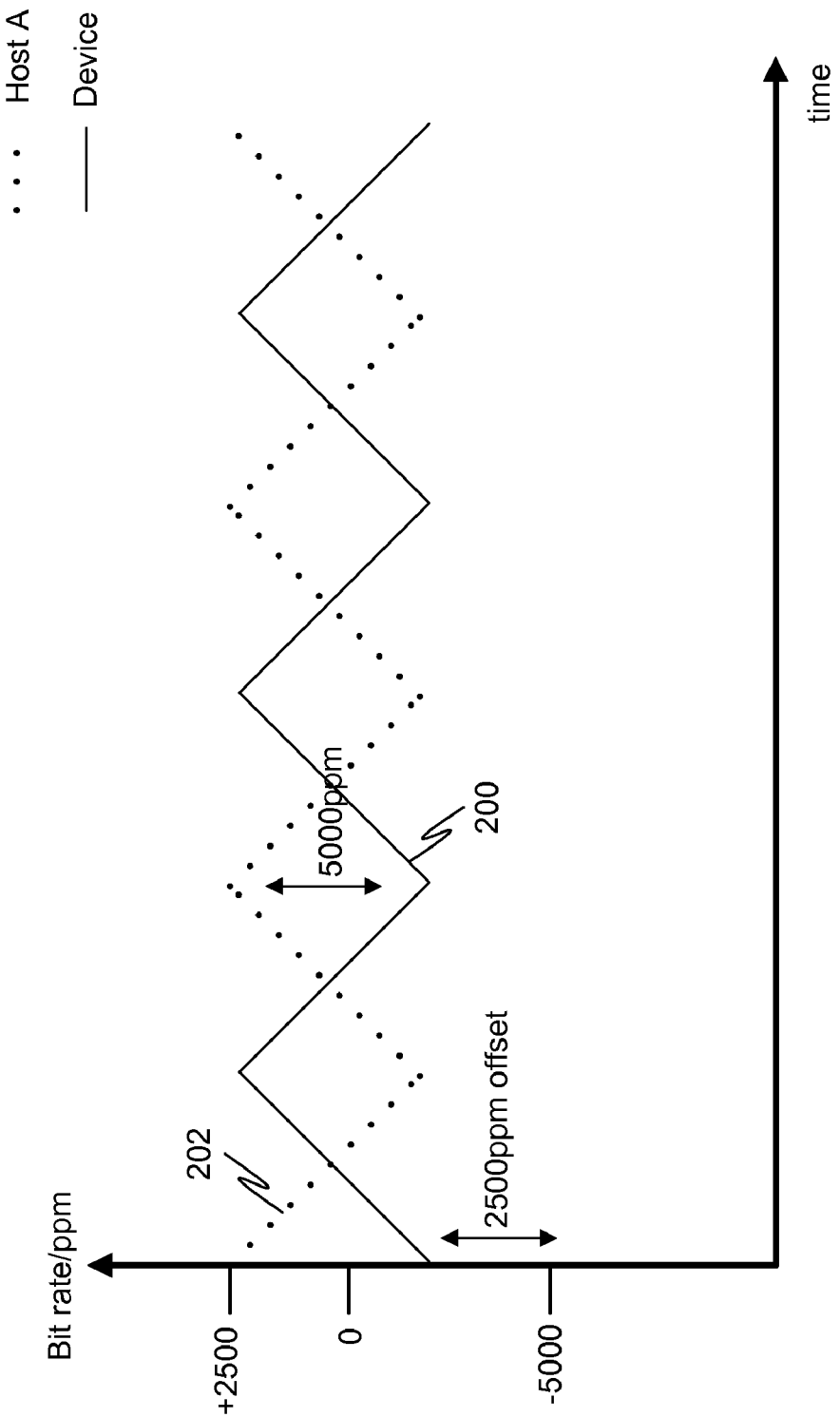
FIG. 2 is a graph illustrating an example embodiment of the present invention.

FIG. 2 is a graph illustrating an example embodiment of the present invention. This example uses the initial reference clocks described in FIG. 1 and the corresponding text. Specifically, initially host A's reference clock and the device's reference clock had a maximum difference of 7500 ppm, which was unacceptable. In FIG. 2, device reference clock 200 has had an offset applied to it of 2500 ppm, so that device reference clock 200 and host A's reference clock 202 have only a difference of 5000 ppm. This allows the device to be compatible with host A without any modifications needing to be made to host A (or even host A to be aware of the change).

Of course, if the device were attached to host B in FIG. 1, then no offset would be necessary as the maximum differences between the two reference clocks was only 5000 ppm.

Figure 3:
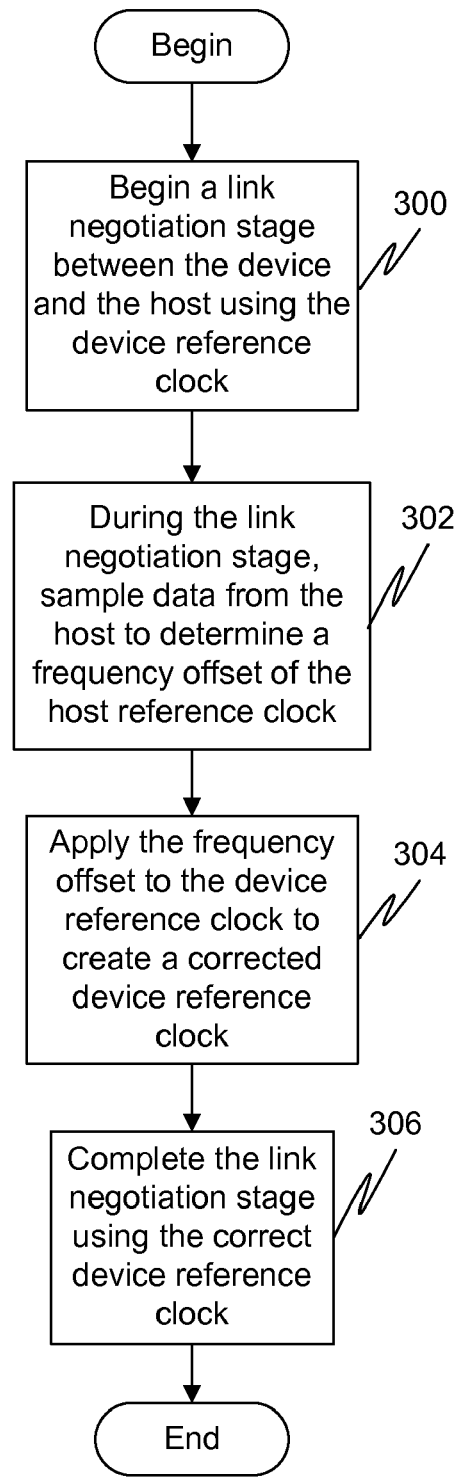
FIG. 3 is a flow diagram illustrating a method for operating a device having a device reference clock, in a system including a host with a host reference clock, in accordance with an embodiment of the present invention.

FIG. 3 is a flow diagram illustrating a method for operating a device having a device reference clock, in a system including a host with a host reference clock, in accordance with an embodiment of the present invention. The device reference clock and the host reference clock may be incompatible with each other because the difference between the device reference clock and the host reference clock is greater than an allowable tolerance of a protocol used by the device (i.e., 5600 parts per million from the USB3.0 protocol). This problem may occur because the host reference clock is overclocked, and/or because the host reference clock is a center-spread reference clock and the device reference clock is a down-spread reference clock.

At 300, a link negotiation stage is begun between the device and the host using the device reference clock. At 302, during the link negotiation stage, data is sampled from the host to determine a frequency offset of the host reference clock. The frequency offset can be a fixed offset if the host is operating in a non-spread spectrum mode, while the frequency offset may be a range of frequency offsets if the host is operating in a spread-spectrum mode. At 304, the frequency offset is applied to the device reference clock to create a corrected device reference clock. At 306, the link negotiation stage is completed using the corrected device reference clock. This may involve either continuing the existing link negotiation stage or restarting it.

Figure 4:
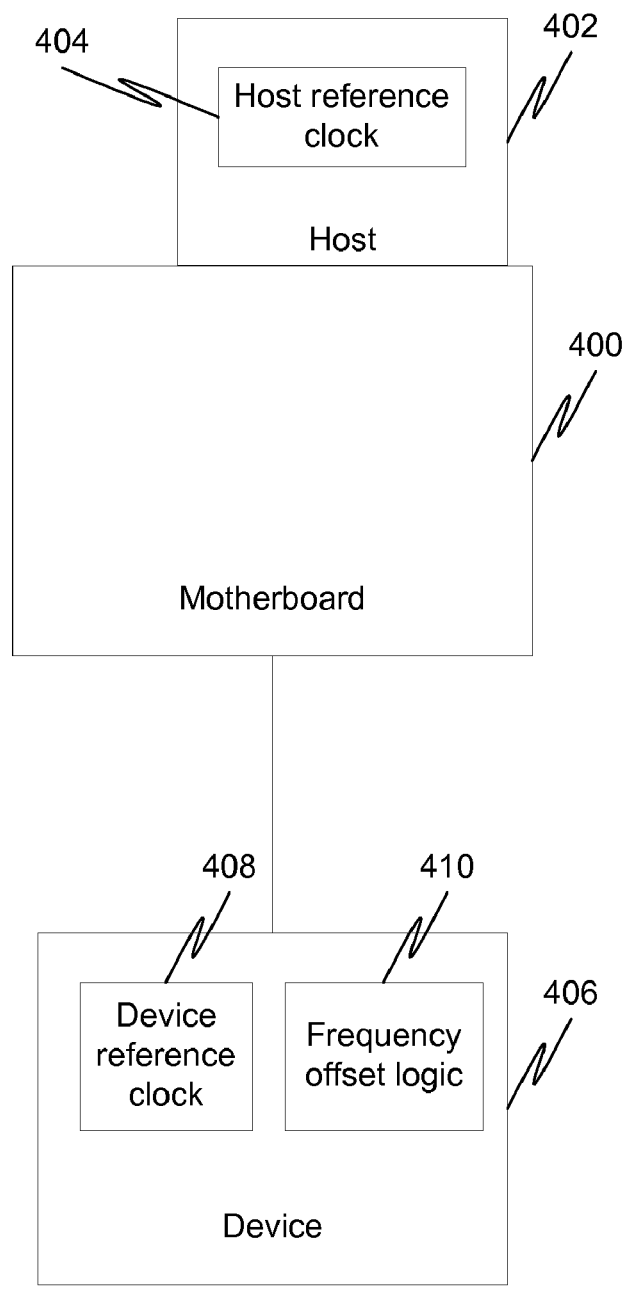
FIG. 4 is a block diagram illustrating a system in accordance with an embodiment of the present invention.

FIG. 4 is a block diagram illustrating a system in accordance with an embodiment of the present invention. The system may include a motherboard 400 attached to a host 402 with a host reference clock 404. Device 406 may contain a device reference clock 408 that may be incompatible with host reference clock 404. Frequency offset logic 410 may then be used on the device to perform the various processes described above. In one embodiment, the frequency offset logic 410 may perform some or all of the elements of FIG. 3 described above.

This logic itself may comprise a series of different circuits designed to perform the required actions. Alternatively, the logic can comprise a software module that is executable by a processor on the device to perform the required actions.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for operating a device having a device reference clock, in a system including a host with a host reference clock, the method comprising:
   beginning a link negotiation stage between the device and the host using the device reference clock;
   during the link negotiation stage, sampling data received from the host to determine a frequency offset of the host reference clock;
   applying the frequency offset to the device reference clock to create a corrected device reference clock; and
   completing the link negotiation stage using the corrected device reference clock, wherein the device reference clock and the host reference clock are incompatible with each other.

2. The method of claim 1, wherein the completing includes restarting the link negotiation stage.

3. The method of claim 1, wherein the difference between the device reference clock and the host reference clock is greater than an allowable tolerance of a protocol used by the device.

4. The method of claim 3, wherein the protocol used by the device is the USB3.0 protocol and the allowable tolerance is 5600 parts per million (ppm).

5. A system comprising:
   a host device having a host reference clock;
   a motherboard coupled to the host device; and
   a device having a device reference clock and coupled to the motherboard, wherein the device has logic to:
   begin a link negotiation stage between the device and the host using the device reference clock;
   during the link negotiation stage, sample data received from the host to determine a frequency offset of the host reference clock;
   apply the frequency offset to the device reference clock to create a corrected device reference clock; and
   complete the link negotiation stage using the corrected device reference clock, wherein the motherboard is operating in a non-spread spectrum mode while the device is operating in a spread spectrum mode.

6. The system of claim 5, wherein the motherboard is clocked using the host reference clock.

7. A device containing a device reference clock, for coupling to a motherboard having a host with a host reference clock, the device comprising:
- means for beginning a link negotiation stage between the device and the host using the device reference clock;
- means for during the link negotiation stage, sampling data received from the host to determine a frequency offset of the host reference clock;
- means for applying the frequency offset to the device reference clock to create a corrected device reference clock; and
- means for completing the link negotiation stage using the corrected device reference clock, wherein the device reference clock and the host reference clock are incompatible with each other.

8. The device of claim 7, wherein the difference between the device reference clock and the host reference clock is greater than an allowable tolerance of a protocol used by the device.

9. The device of claim 7, wherein the host reference clock is overclocked.

10. The device of claim 7, wherein the host reference clock is a center-spread reference clock and the device reference clock is a down-spread reference clock.

11. A program storage device readable by a machine tangibly embodying a program of instructions executable by the machine to perform a method for operating a device having a device reference clock, in a system including a host with a host reference clock, the method comprising:
- beginning a link negotiation stage between the device and the host using the device reference clock;
- during the link negotiation stage, sampling data received from the host to determine a frequency offset of the host reference clock;
- applying the frequency offset to the device reference clock to create a corrected device reference clock; and
- completing the link negotiation stage using the corrected device reference clock, wherein the device reference clock and the host reference clock are incompatible with each other.

12. The program storage device of claim 11, wherein the completing includes restarting the link negotiation stage.

13. A method for operating a device having a device reference clock, in a system including a host with a host reference clock, the method comprising:
- beginning a link negotiation stage between the device and the host using the device reference clock;
- during the link negotiation stage, sampling data received from the host to determine a frequency offset of the host reference clock, wherein the frequency offset is a fixed offset if the host is operating in a non-spread spectrum mode;
- applying the frequency offset to the device reference clock to create a corrected device reference clock; and
- completing the link negotiation stage using the corrected device reference clock.

14. A method for operating a device having a device reference clock, in a system including a host with a host reference clock, the method comprising:
- beginning a link negotiation stage between the device and the host using the device reference clock;
- during the link negotiation stage, sampling data received from the host to determine a frequency offset of the host reference clock, wherein the frequency offset is a range of frequency offsets if the host is operating in a spread-spectrum mode;
- applying the frequency offset to the device reference clock to create a corrected device reference clock; and
- completing the link negotiation stage using the corrected device reference clock.

15. A method for operating a device having a device reference clock, in a system including a host with a host reference clock, the method comprising:
- beginning a link negotiation stage between the device and the host using the device reference clock;
- during the link negotiation stage, sampling data received from the host to determine a frequency offset of the host reference clock, wherein the host reference clock is overclocked;
- applying the frequency offset to the device reference clock to create a corrected device reference clock; and
- completing the link negotiation stage using the corrected device reference clock.

16. A method for operating a device having a device reference clock, in a system including a host with a host reference clock, the method comprising:
- beginning a link negotiation stage between the device and the host using the device reference clock;
- during the link negotiation stage, sampling data received from the host to determine a frequency offset of the host reference clock, wherein the host reference clock is a center-spread reference clock and the device reference clock is a down-spread reference clock.;
- applying the frequency offset to the device reference clock to create a corrected device reference clock; and
- completing the link negotiation stage using the corrected device reference clock.

* * * * *